United States Patent
Takeda et al.

(10) Patent No.: US 10,330,934 B2
(45) Date of Patent: *Jun. 25, 2019

(54) IMAGE RELAY OPTICAL SYSTEM AND VIRTUAL IMAGE DISPLAY DEVICE INCLUDING THE SAME

(71) Applicant: SEIKO EPSON CORPORATION, Tokyo (JP)

(72) Inventors: Takashi Takeda, Suwa (JP); Takahiro Totani, Suwa (JP); Akira Komatsu, Kamiina-gun (JP); Masayuki Takagi, Shiojiri (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/985,992

(22) Filed: Dec. 31, 2015

(65) Prior Publication Data

US 2016/0116744 A1 Apr. 28, 2016

Related U.S. Application Data

(62) Division of application No. 13/419,099, filed on Mar. 13, 2012, now Pat. No. 9,261,688.

(30) Foreign Application Priority Data

Mar. 22, 2011 (JP) .................................. 2011-062542

(51) Int. Cl.
*G02B 27/14* (2006.01)
*G02B 27/01* (2006.01)
(Continued)

(52) U.S. Cl.
CPC ......... *G02B 27/0172* (2013.01); *G02B 6/003* (2013.01); *G02B 6/0028* (2013.01);
(Continued)

(58) Field of Classification Search
CPC .............. G02B 27/017; G02B 27/0172; G02B 2027/011; G02B 6/0028; G02B 2027/013;
(Continued)

(56) References Cited

U.S. PATENT DOCUMENTS 4,840,465 A 6/1989 Loy et al.
5,453,877 A * 9/1995 Gerbe .................. G02B 17/008
359/630

(Continued)

FOREIGN PATENT DOCUMENTS

JP S63-142313 A 6/1988
JP 2000131614 A 5/2000
(Continued)

OTHER PUBLICATIONS

Oct. 6, 2015 Notice of Allowance issued in U.S. Appl. No. 13/419,099.
(Continued)

*Primary Examiner* — Mustak Choudhury
(74) *Attorney, Agent, or Firm* — Oliff PLC

(57) ABSTRACT

An image relay optical system is provided with an optical coupling member before incidence of image light on a light guide member. Among a first light incident surface, a coupling member reflecting surface, and a first light emitting surface provided in the optical coupling member, the coupling member reflecting surface and the first light emitting surface are curved surfaces. Therefore, a large bright virtual image with reduced aberration can be displayed.

19 Claims, 7 Drawing Sheets

(51) Int. Cl.
  *G02B 17/08* (2006.01)
  *F21V 8/00* (2006.01)
  *G02B 17/00* (2006.01)
(52) U.S. Cl.
  CPC ......... *G02B 17/008* (2013.01); *G02B 17/086* (2013.01); *G02B 2027/011* (2013.01); *G02B 2027/013* (2013.01)
(58) Field of Classification Search
  CPC .... G02B 17/086; G02B 17/008; G02B 27/01; G02B 2027/0178; G02B 2027/0125; G02B 6/005; G02B 27/0025; G02B 27/02; G02B 27/011; G02B 27/14; G02B 7/017; G02B 17/0812; G02B 6/003; G02B 27/0081; G02B 27/0101; G02B 27/0176; G02B 27/46; G02B 27/123; G02B 27/126; G02B 27/143; G02B 27/144; G02B 27/146; G02B 27/1066; G02B 37/04; A61B 1/05
  USPC ... 359/13, 727, 729, 201.1, 207.8, 431, 480, 359/627–634; 345/8, 633; 353/38; 396/333
  See application file for complete search history.

(56) References Cited

U.S. PATENT DOCUMENTS

| | | | |
|---|---|---|---|
| 5,999,311 A * | 12/1999 | Nanba | G02B 15/16 359/365 |
| 6,327,094 B1 * | 12/2001 | Aoki | G02B 13/22 359/631 |
| 6,590,713 B2 | 7/2003 | Okuyama | |
| 6,639,729 B2 * | 10/2003 | Tanaka | G02B 17/0663 348/E5.025 |
| 6,646,809 B1 | 11/2003 | Ishino et al. | |
| 7,477,453 B2 | 1/2009 | Repetto et al. | |
| 7,689,116 B2 | 3/2010 | You et al. | |
| 7,755,837 B2 | 7/2010 | Yamamoto | |
| 2001/0010598 A1 | 8/2001 | Aritake et al. | |
| 2001/0033401 A1 | 10/2001 | Kasai et al. | |
| 2002/0054436 A1 | 5/2002 | Uehara et al. | |
| 2003/0038923 A1 * | 2/2003 | Aastuen | G02B 27/1026 353/31 |
| 2003/0197943 A1 | 10/2003 | Yamazaki et al. | |
| 2004/0223122 A1 | 11/2004 | Inoguchi et al. | |
| 2007/0047091 A1 | 3/2007 | Spitzer et al. | |
| 2010/0254018 A1 * | 10/2010 | Burke | G02B 27/0101 359/633 |
| 2011/0050727 A1 | 3/2011 | Mukawa | |
| 2011/0292513 A1 | 12/2011 | Kubota | |

FOREIGN PATENT DOCUMENTS

| | | |
|---|---|---|
| JP | 2001-290102 A | 10/2001 |
| JP | 2008-535001 A | 8/2008 |

OTHER PUBLICATIONS

Jun. 19, 2015 Office Action issued in U.S. Appl. No. 13/419,099.
Apr. 11, 2014 Office Action issued in U.S. Appl. No. 13/419,099.
May 9, 2013 Office Action issued in U.S. Appl. No. 13/419,099.

* cited by examiner

IMAGE RELAY OPTICAL SYSTEM AND VIRTUAL IMAGE DISPLAY DEVICE INCLUDING THE SAME

This is a Divisional Application of application Ser. No. 13/419,099 filed Mar. 13, 2012 which claims priority to JP 2011-062542 filed Mar. 22, 2011. The disclosure of the prior application is hereby incorporated by reference herein in its entirety.

BACKGROUND

1. Technical Field

The present invention relates to an image relay optical system used for a head mounted display mounted on the head and used and a virtual image display device including the image relay optical system.

2. Related Art

In recent years, as a virtual image display device for enabling formation and observation of a virtual image such as a head mounted display, various virtual image display devices of a type for guiding image light from a display device to the pupils of an observer with a light guide plate are proposed. As the light guide plate for such virtual image display device, there is a light guide plate including a light guide pipe that can cause plural optical modes having different light guide angles to proceed (see JP-T-2008-535001).

In an optical system disclosed in JP-T-2008-535001, a liquid crystal panel is illuminated with collimated light set to a different incident angle for each of the optical modes on condition that images in the plural optical modes are positionally shifted from one another. Display contents are changed in the optical modes and displays in the optical modes are sequentially executed to join images in the optical modes and obtain an overall image. In this case, an image in the center and images on the left and right included in the overall image have to be displayed while being changed with a time lag by one liquid crystal panel. As a result, a virtual image display device is complicated and an observation image is darkened.

There is also a virtual image display device for enabling observation of a virtual image with a light guide member in which a concave reflecting surface is provided accompanying a light incident surface and a convex reflecting surface is provided accompanying a light emitting surface. In the virtual image display device, it is unnecessary to join images with a time lag (see U.S. Pat. No. 7,477,453). An afocal system is formed by the two inclining reflecting surfaces. Aberration such as distortion is not reduced. Therefore, a projection optical system for collimate is complicated and image processing is necessary.

SUMMARY

An advantage of some aspects of the invention is to provide an image relay optical system that can simply display a large bright virtual image with relatively small aberration and a virtual image display device incorporating the image relay optical system.

An aspect of the invention is directed to an image relay optical system including (a) an optical coupling member that is formed of a light transmissive material and on which image light is made incident and (b) a light guide member that is formed of a light transmissive material and guides the image light from the optical coupling member and emits the image light to the outside. (c) The optical coupling member includes at least a first light incident surface, a coupling member reflecting surface, and a first light emitting surface in order of incidence of the image light. (d) At least one of the first light incident surface, the coupling member reflecting surface, and the first light emitting surface is a curved surface. (e) The light guide member includes at least a second light incident surface, first and second total reflecting surfaces opposed to and extending in parallel to each other, a light guide member reflecting surface, and a second light emitting surface. (f) The light guide member reflecting surface is a curved surface. (g) The second light emitting surface is a flat surface. In the image relay optical system, the optical coupling member is provided before the incidence of the image light on the light guide member. At least one of the first light incident surface, the coupling member reflecting surface, and the first light emitting surface provided in the optical coupling member is the curved surface. Therefore, it is possible to display a large bright virtual image with reduced aberration.

A specific aspect of the invention is directed to the image relay optical system, wherein the coupling member reflecting surface is a total reflection mirror that reflects most of the image light and the light guide member reflecting surface is a concave convergent surface that converts the image light, which is focused as an intermediate image in the light guide member, into parallel beams. The total reflection includes reflecting nearly 100% of light by, for example, providing a reflection film. In this case, a loss of light on the coupling member reflecting surface is reduced. A substantially infinite virtual image can be formed by the conversion into the parallel beams on the light guide member reflecting surface.

Another aspect of the invention is directed to the image relay optical system, wherein in the optical coupling member, the first light incident surface is a surface functioning as a total reflecting surface, the coupling member reflecting surface is a concave convergent surface, and the first light emitting surface is a convex convergent surface. In the light guide member, the second light incident surface is a convex convergent surface. In this case, the convergent surfaces provided in the optical coupling member and the light guide member enable correction of distortion and the like. A bright virtual image with reduced aberration can be formed. A loss of light is reduced by the total reflection on the first light incident surface.

Still another aspect of the invention is directed to the image relay optical system, wherein in the optical coupling member, the first light incident surface is a convex convergent surface, the coupling member reflecting surface is a concave convergent surface, and the first light emitting surface is a convex convergent surface. In the light guide member, the second light incident surface is a convex convergent surface. In this case, the convergent surfaces provided in the optical coupling member and the light guide member enable correction of distortion and the like. A bright virtual image with reduced aberration can be formed.

Yet another aspect of the invention is directed to the image relay optical system, wherein in the optical coupling member, the first light incident surface is a convex convergent surface, the coupling member reflecting surface is a concave convergent surface, and the first light emitting surface is a convex convergent surface. In the light guide member, the second light incident surface is a surface functioning as a first total reflecting surface. The light guide member includes a total reflection opposed reflecting surface that includes a concave convergent surface opposed to the second light incident surface and reflects the image light from the second light incident surface to the first total reflecting surface. The image relay optical system includes a convergent lens arranged between the first light emitting surface of the optical coupling member and the second light incident surface of the light guide member. In this case, the convergent surfaces provided in the optical coupling member and the light guide member enable correction of distortion and the like. The convergent lens arranged between the first light emitting surface and the second light incident surface enables adjustment of beams of the image light. Consequently, a bright virtual image with reduced aberration can be formed.

Still yet another aspect of the invention is directed to the image relay optical system, wherein in the optical coupling member, the first light incident surface is a surface functioning as a total reflecting surface, the coupling member reflecting surface is a total reflection concave convergent surface, and the first light emitting surface is a convex convergent surface. In the light guide member, the second light incident surface is a convex convergent surface. The image relay optical system includes a convergent lens arranged to be opposed to the first light incident surface of the optical coupling member. In this case, the convergent surfaces provided in the optical coupling member and the light guide member enable correction of distortion and the like. A loss of light is reduced on the optical coupling member and the coupling member reflecting surface. Further, the convergent lens arranged to be opposed to the first light incident surface of the optical coupling member enables adjustment of beams of the image light. Consequently, a bright virtual image with reduced aberration can be formed.

Further another aspect of the invention is directed to the image relay optical system, wherein the light guide member reflecting surface of the light guide member is a semi-transmissive mirror. The image relay optical system includes a light transmitting member that includes a curved surface joined to the semi-transmissive mirror and makes it possible to see an external image through the second light emitting surface and the light guide member reflecting surface. In this case, the light transmitting member joined to the back of the semi-transmissive mirror enables satisfactory see-through observation.

Still further another aspect of the invention is directed to the image relay optical system, wherein at least one of a refractive index and dispersion of the optical coupling member is different from a refractive index and dispersion of the light guide member. In this case, various kinds of aberration including chromatic aberration of the image light can be corrected by adjusting the reflective index and the dispersion between the optical coupling member and the light guide member. Yet further aspect of the invention is directed to a virtual image display device including the image relay optical system explained above and an image forming device that forms image light guided by the image relay optical system. In this case, the virtual image display device can simply display a large bright virtual image with relatively small aberration by using the image relay optical system.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
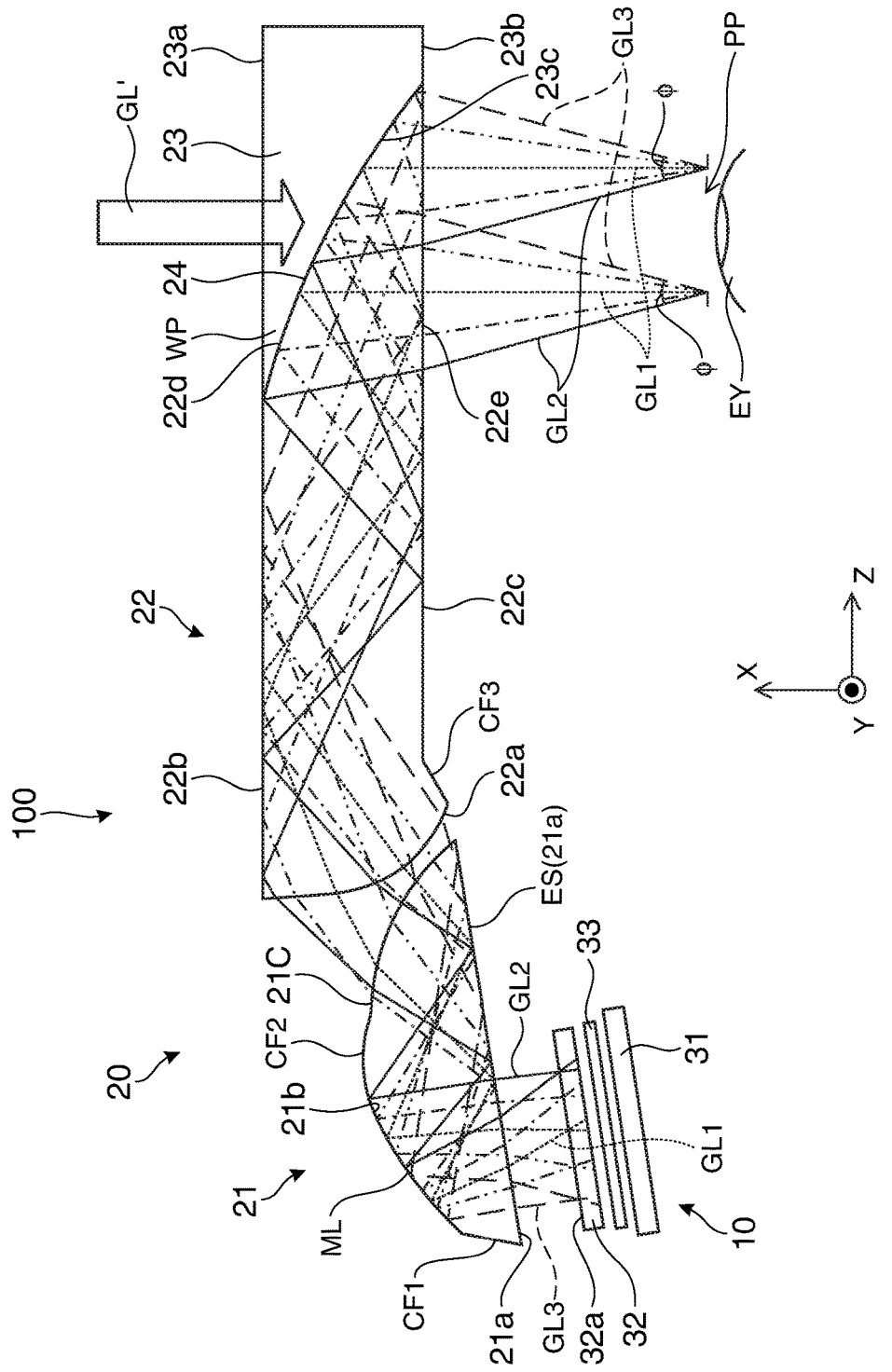
FIG. 1 is a plan view showing a one eye side of an image relay optical system and a virtual image display device incorporating the image relay optical system according to a first embodiment.

An image relay optical system for a virtual image display device and a virtual image display device incorporating the image relay optical system according to a first embodiment of the invention are explained below with reference to the accompanying drawings.

A. Structure of the Image Relay Optical System and the Virtual Image Display Device A virtual image display device 100 according to this embodiment shown in FIG. 1 is applied to a headmounted display and includes an image forming device 10 and an image relay optical system 20 as a set.

The virtual image display device 100 causes an observer to recognize image lights generated by a virtual image and causes the observer to observe an external image in a see-through manner. FIG. 1 shows only the virtual image display device 100 for the left eye. However, as the entire virtual image display device 100, the set of the image forming device 10 and the image relay optical system 20 is provided to correspond to each of the right eye and the left eye of the observer. Since the virtual image display device 100 for the right eye and the virtual image display device 100 for the left eye are symmetrical, only the virtual image display device 100 for the left eye is explained. Detailed explanation of the virtual image display device 100 for the right eye is omitted. As shown in FIG. 1, the image forming device 10 includes an illumination device 31 that emits two-dimensional illumination light, a liquid crystal display device 32, which is a transmissive spatial light modulating device, and an emission angle adjusting member 33 arranged between the illumination device 31 and the liquid crystal display device 32. The liquid crystal display device 32 spatially modulates the illumination light emitted from the illumination device 31 and forms image lights that should be a display target such as a moving image. The emission angle adjusting member 33 changes an emission angle distribution of the illumination light according to a position in a screen and adjusts the image lights emitted from an emitting surface 32a of the liquid crystal display device 32 such that the image lights are efficiently made incident on an eye EY of the observer. The image relay optical system 20 includes an optical coupling member 21, a light guide member 22, and a light transmitting member 23. The optical coupling member 21 is a member that is formed of a light transmissive material and propagates image lights from the image forming device 10 while converging the image lights as appropriate and emits the image lights to the light guide member 22. The light guide member 22 is a member that is formed of a light transmissive material and guides the image lights from the optical coupling member 21 and finally emits the image lights to the outside as image lights converted into parallel beams. The light transmitting member 23 is formed of a light transmissive material having a refractive index same as the refractive index of the light guide member 22. The light transmitting member 23 is joined to the interior side of the light guide member 22 and enables the observer to see an external image through the light transmitting member 23. As shown in FIG. 2, the light transmitting member 23 is arranged between a pair of light guide members 22, 22 provided to correspond to the left and right eyes EY, EY of the observer and is joined to the pair of light guide members 22, 22. Consequently, the pair of light guide members 22, 22 and the light transmitting member 23 are connected and integrated as one member. In other words, the light transmitting member 23 is a suspended member suspended from one light guide member 22 to the other light guide member 22.

Figure 2:
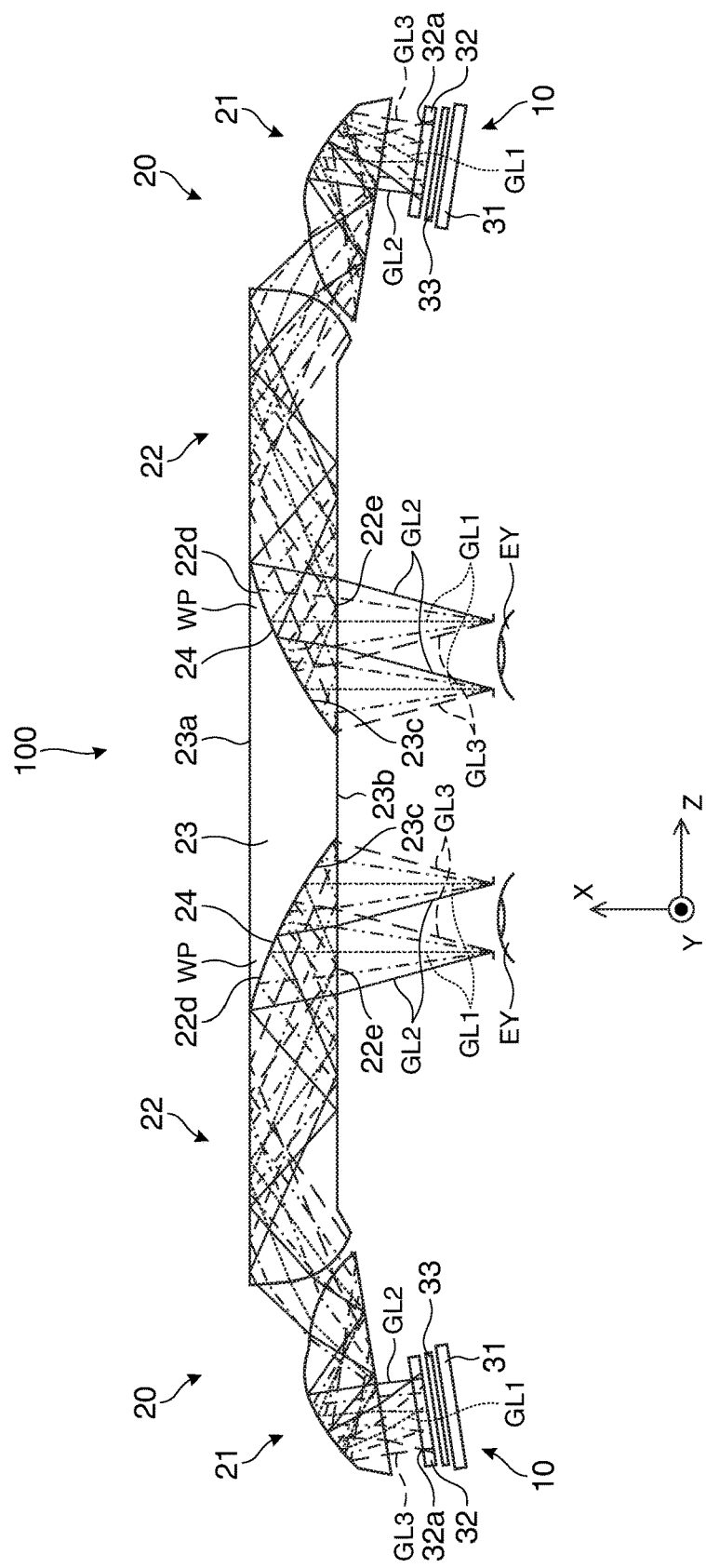
FIG. 2 is a plan view showing the entire virtual image display device.

As shown in FIG. 1, the optical coupling member 21 is a columnar light guide member extending in a Y direction and includes a first light incident surface 21a, a coupling member reflecting surface 21b, and a first light emitting surface 21c. When a route of the image lights is considered, the surfaces 21a, 21b, and 21c are arrayed in order of incidence of the image lights. A connecting surface CF1, which is a surface for connecting the first light incident surface 21a and the coupling member reflecting surface 21b and is not optically used, is present between the first light incident surface 21a and the coupling member reflecting surface 21b. A connecting surface CF2 is present between the coupling member reflecting surface 21b and the first light emitting surface 21c. The first light incident surface 21a and the first light emitting surface 21c are adjacent to and directly connected to each other. Among these optically used surfaces, the first light incident surface 21a is a flat surface extending while being opposed to the emitting surface 32a of the liquid crystal display device 32 and is a surface for capturing the image lights emitted from the image forming device 10 into the optical coupling member 21. The first light incident surface 21a includes an extended surface ES, which is a surface on an extended region outside a region on which the image lights are made incident from the image forming device 10. The coupling member reflecting surface 21b is a concave convergent surface (specifically, a concave spherical surface or aspherical surface). The coupling member reflecting surface 21b includes a reflection film ML, which is formed by aluminum evaporation or the like, to function as a total reflection mirror that reflects most of the image lights captured from the first light incident surface 21a. In other words, nearly 100% of the image lights are reflected by the reflection film ML. The first light emitting surface 21c is a convex convergent surface (specifically, a convex spherical surface or aspherical surface). The first light emitting surface 21c emits the image lights to the light guide member 22 located on a downstream side in an optical path.

The light guide member 22 is a tabular light guide member extending in a YZ direction and includes a second light incident surface 22a, first and second total reflecting surfaces 22b and 22c, a light guide member reflecting surface 22d, and a second light emitting surface 22e. When the route of the image lights is considered, the surfaces 22a, 22b, 22c, 22d, and 22e are arrayed in order of incidence of the image lights. A connecting surface CF 3 is present between the second light incident surface 22a and the second total reflecting surface 22c. Adjacent surfaces of the other surfaces are directly connected to each other. Among these optically used surfaces, the second light incident surface 22a is a convex convergent surface (specifically, a convex spherical surface or aspherical surface). The second light incident surface 22a is arranged to be opposed to the first light emitting surface 21c of the optical coupling member 21. The image lights emitted from the optical coupling member 21 are made incident on the second light incident surface 22a. The first and second total reflecting surfaces 22b and 22c are surfaces extending in a Z direction in an opposed and parallel state. The first and second total reflecting surfaces 22b and 22c guide the image lights made incident from the second light incident surface 22a from an entrance side to an interior side in the light guide member 22 by totally reflecting the image lights. The light guide member reflecting surface 22d is a concave convergent surface (specifically, a concave spherical surface or aspherical surface). The light guide member reflecting surface 22d bends the image lights while converting the image lights into parallel beams. The light guide member reflecting surface 22d is formed as a semi-transmissive mirror accompanied by a half mirror layer 24, which is a reflection film having transmissivity (i.e., a semi-transmissive reflection film). The second light emitting surface 22e is a surface present on the extension of the second total reflecting surface 22c and extending along a flat surface, i.e., a YZ plane. The second light emitting surface 22e emits the image lights, which have passed through the light guide member reflecting surface 22d, to the eyes of the observer. In other words, the image lights are emitted from the second light emitting surface 22e to the outside of the light guide member 22 and reach the eye EY of the observer.

As explained above, both of the optical coupling member 21 and the light guide member 22 include the concave and convex curved surfaces (specifically, the first light emitting surface 21c, the second light incident surface 22a, etc.) to make it possible to change states of convergence and divergence of the image lights. The shapes of the curved surfaces defined by a curvature, a curvature center, an aspherical coefficient, and the like are adjusted as appropriate to apply reflection and refraction action matching the arrangement of the curved surfaces to the image lights. This makes it possible to reduce occurrence of aberration represented by distortion. In the optical coupling member 21 and the light guide member 22, at least one of characteristics of a refractive index and dispersion are set different from each other to vary the reflection and refraction action applied to the image lights. This makes it possible to cope with occurrence of chromatic aberration.

Figure 3:
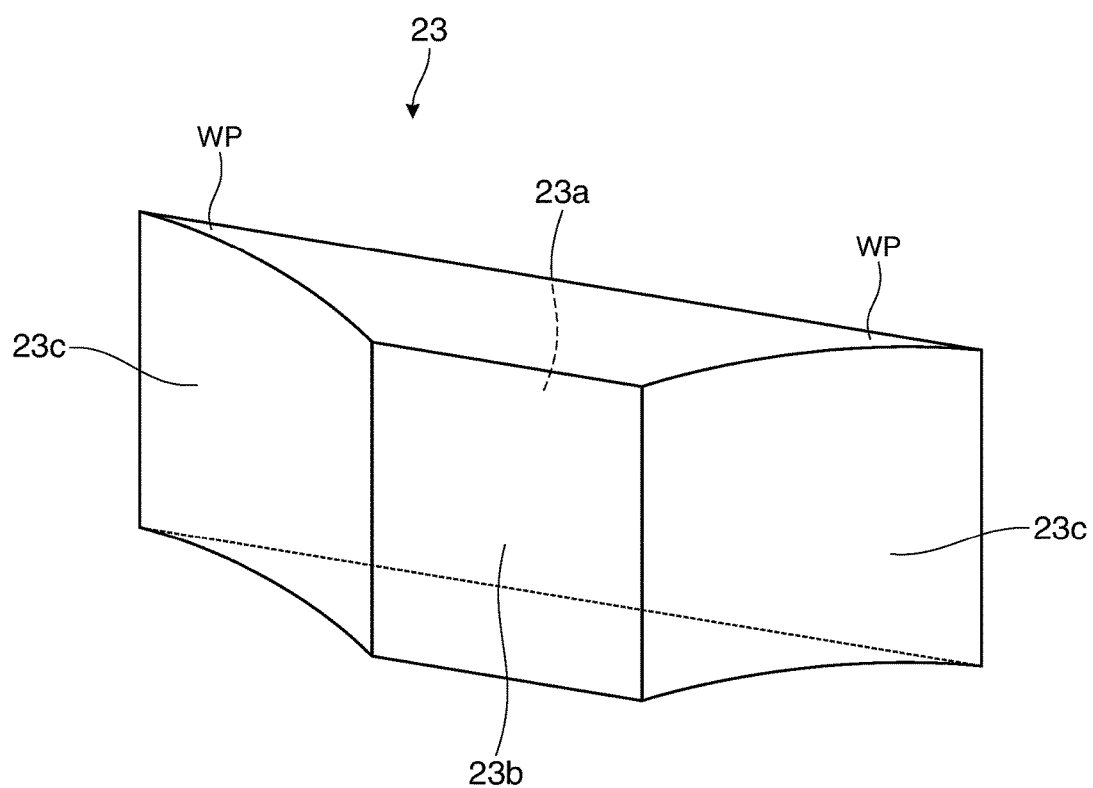
FIG. 3 is a perspective view showing a light transmitting member.

As shown in FIGS. 1 to 3, the light transmitting member 23 has a refractive index same as the refractive index of the main body of the light guide member 22 and includes a first surface 23a, a second surface 23b, and a third surface 23c. The first and second surfaces 23a and 23b extend onto extended planes of the first and second total reflecting surfaces 22b and 22c along the YZ plane. The third surface 23c is formed as a curved surface arranged along the light guide member reflecting surface 22d of the light guide member 22. In other words, the light transmitting member 23 is formed as a member including a wedge-like member WP held between the second surface 23b and the third surface 23c. The third surface 23c is formed as a joined surface joined to the half mirror layer 24 of the light guide member 22. Like the light guide member 22, the light transmitting member 23 indicates high light transmissivity in a visible range. Therefore, it is possible to see an external image through the second light emitting surface 22e and the light guide member reflecting surface 22d of the light guide member 22. For example, the observer can observe image light GL reduced to 20% and external light GL' reduced to 80% superimposed one on top of the other by the adjustment of the reflectance of the half mirror layer 24.

B. Optical Paths of Image Lights

Optical paths of image lights are explained below. Among components of image lights emitted from the image forming device 10 shown in FIG. 1, optical paths of image lights GL1, GL2, and GL3 emitted from the center and both the end sides of the liquid crystal display device 32 are traced and explained. Optical paths of components of the other image lights are intermediate optical paths of the optical paths of the image lights GL1, GL2, and GL3 and are the same as the optical paths of the image lights GL1, GL2, and GL3. Therefore, explanation of the optical paths is omitted.

First, the image light GL1 emitted from the center on the emitting surface 32a of the liquid crystal display device 32 is emitted to the optical coupling member 21 in a state in which the image light GL1 diverges from one point on the emitting surface 32a. The image light GL1 is made incident on the first light incident surface 21a, which is a flat surface. The image light GL1 passing through the first light incident surface 21a and propagating in the optical coupling member 21 is reflected on the coupling member reflecting surface 21b. When the image light GL1 is reflected, since the coupling member reflecting surface 21b is a concave convergent surface, the image light GL2 changes to a state in which the image light GL2 is converted into substantially parallel beams. A traveling direction of the image light GL2 is bent. The image light GL2 travels to the first light incident surface 21a again. An angle with respect to the first light incident surface 21a and an incident position of the image light GL1 change from those during first incidence according to the reflection action on the coupling member reflecting surface 21b. In this case, the image light GL1 is adapted to be made incident at an angle at which the image light GL1 is totally reflected without requiring a reflection film or the like, i.e., an angle equal to or larger than a critical angle on the first light incident surface 21a including the extended surface ES. In other words, the first light incident surface 21a in this case functions as a total reflecting surface that totally reflects the image light GL1. According to the total reflection, the image light GL1 travels to the first light emitting surface 21c while hardly losing a light amount. The image light GL1 is subjected to converging action on the first light emitting surface 21c and emitted from the first light emitting surface 21c to the light guide member 22. Consequently, the image light GL1 emitted from the optical coupling member 21 is made incident on the second light incident surface 22a of the light guide member 22.

Subsequently, the image light GL1 captured into the light guide member 22 from the second light incident surface 22a is subjected to the converging action on the second light incident surface 22a. Specifically, both of the first light emitting surface 21c and the second light incident surface 22a are convex convergent surfaces and, according to the refraction action on the surfaces, the image light GL1 changes from a state in which the image light GL1 is converted into substantially parallel beams to a state in which the image light GL1 converges. The image light GL1 passed through the second light incident surface 22a is first totally reflected on the first total reflecting surface 22b located on a +X side of the first and second total reflecting surfaces 22b and 22c opposed to and extending in parallel to each other in the Z direction, i.e., parallel to the YZ plane. Thereafter, the image light GL1 is totally reflected on the second total reflecting surface 22c located on a −X side. While being totally reflected on the total reflecting surfaces 22b and 22c in this way, the image light GL1 in the converged state is once focused and then changes to the diverged state again and travels to the light guide member reflecting surface 22d. The light guide member reflecting surface 22d is a concave convergent surface. Therefore, the optical path of the image light GL1 is bent according to the reflection action on the light guide member reflecting surface 22d. The image light GL1 changes from the diverged state to the converted state into parallel beams and travels to the second light emitting surface 22e. The image light GL1 is emitted as parallel beams, which form a virtual image, to the eye EY of the observer perpendicularly to a +Z direction from the center side of the second light emitting surface 22e, i.e., in a −X direction.

The image light GL2 emitted from the end on a +Z side on the emitting surface 32a of the liquid crystal display device 32 and the image light GL3 emitted from the end on a −Z side on the emitting surface 32a of the liquid crystal display device 32 follow optical paths similar to the optical path of the image light GL1. Specifically, the image lights GL2 and GL3 are emitted to the optical coupling member 21 in a state in which the image lights GL2 and GL3 diverge from one point on the emitting surface 32a, pass through the surfaces of the optical coupling member 21 and the light guide member 22, and, after once being focused in the light guide member 22, are emitted to the eye EY of the observer as virtual image lights. The image light GL2 is emitted at an acute angle with respect to the +Z direction along the second light emitting surface 22e when the image light GL2 passes through the second light emitting surface 22e. The image light GL3 is emitted at an obtuse angle with respect to the +Z direction along the second light emitting surface 22e when the image light GL3 passes through the second light emitting surface 22e. All components of the image lights GL2 and GL3 and the other image lights other than the image light GL1 are subjected to the refraction and reflection action at different degrees on the first light incident surface 21a, the first light emitting surface 21c, the second light incident surface 22a, and the like having the concave and convex curved surface shapes.

In general, when image light is emitted from an oblique direction or a reflection optical system is used, aberration such as distortion particularly tends to occur. Therefore, in the optical system in this embodiment, it is highly likely that aberration occurs. On the other hand, in the image relay optical system 20, all the components of the image lights are subjected to the refraction and reflection action at different degrees on the first light emitting surface 21c, the second light incident surface 22a, and the like. Therefore, the image relay optical system 20 enables correction of distortion that occurs in the image relay optical system 20. In correcting the distortion, the image relay optical system 20 also enables correction of chromatic aberration.

All the beams of the image lights change to the diverged state and then travel to the light guide member reflecting surface 22d after once being focused in the light guide member 22. Therefore, when the image lights are emitted from the image relay optical system 20, the image lights are converted into parallel beams by the light guide member reflecting surface 22d, which is the concave convergent surface. In other words, the light guide member reflecting surface 22d is a surface for converting image lights focused as an intermediate image into parallel beams in the light guide member 22. The image lights converted into the parallel beams on the light guide member reflecting surface 22d are combined in the position of the eye EY of the observer and recognized as a virtual image. As explained above, the image lights are made incident on the light guide member reflecting surface 22d in a state in which the image lights are already subjected to correction of distortion or the like further on an upstream side in the optical path than the light guide member reflecting surface 22d. Therefore, the image lights passed through the light guide member reflecting surface 22d are in a satisfactory state in which the image lights are corrected. When aberration occurs because of the reflection on the light guide member reflecting surface 22d, the image lights can be corrected in the optical system further on the upstream side on the optical path than the light guide member reflecting surface 22d taking into account even this aberration in advance. As explained above, chromatic aberration of the image lights can also be corrected by adjusting the refractive indexes and the dispersion of the optical coupling member 21 and the light guide member 22. In this case, since the image relay optical system 20 includes the curved surfaces, an angle of view φ of the image lights indicated by the image light GL2 to the image light GL3 can be set relatively large on the eye EY side. Further, the width of the parallel beams converted from the image lights can be increased. As a result, an eye ring diameter PP, which is an effective pupil diameter, can be increased.

In the total reflection on all of the first light incident surface 21a and the first and second total reflecting surfaces 22b and 22c, the image light GL2 among the components of the image lights has the largest total reflection angle. On the other hand, the image light GL3 has the smallest total reflection angle. Therefore, if the image light GL3 having strictest condition is adapted to propagate at an angle that satisfies the total reflection condition, all the image lights can be totally reflected without requiring a reflection film or the like.

As explained above, the light guide member reflecting surface 22d is the semi-transmissive half mirror surface and the light transmitting member 23 is formed of the light transmissive material. Therefore, the observer can recognize the external light GL' together with the image lights via the light transmitting member 23 and the light guide member reflecting surface 22d.

As explained above, in the image relay optical system 20 according to this embodiment, the optical coupling member 21 is provided before the incidence of the image lights on the light guide member 22. The curved surface is present among the first light incident surface 21a, the coupling member reflecting surface 21b, and the first light emitting surface 21c provided in the optical coupling member 21. Therefore, a large bright virtual image with reduced aberration can be displayed. In this case, since the image relay optical system 20 includes the two sections: the optical coupling member 21 and the light guide member 22, it is possible to hold an air layer between the optical coupling member 21 and the light guide member 22 to provide a refractive index difference and increase action by refraction.

Second Embodiment

A second embodiment obtained by modifying the first embodiment is explained below with reference to FIG. 4. An image relay optical system and a virtual image display device according to this embodiment have structure same as the structure shown in FIG. 1 except the optical coupling member 21 and the light guide member 22. Therefore, explanation is omitted concerning components serving as functional components of the image forming device 10 and the like. The light transmitting member is not shown in the figure.

Figure 4:
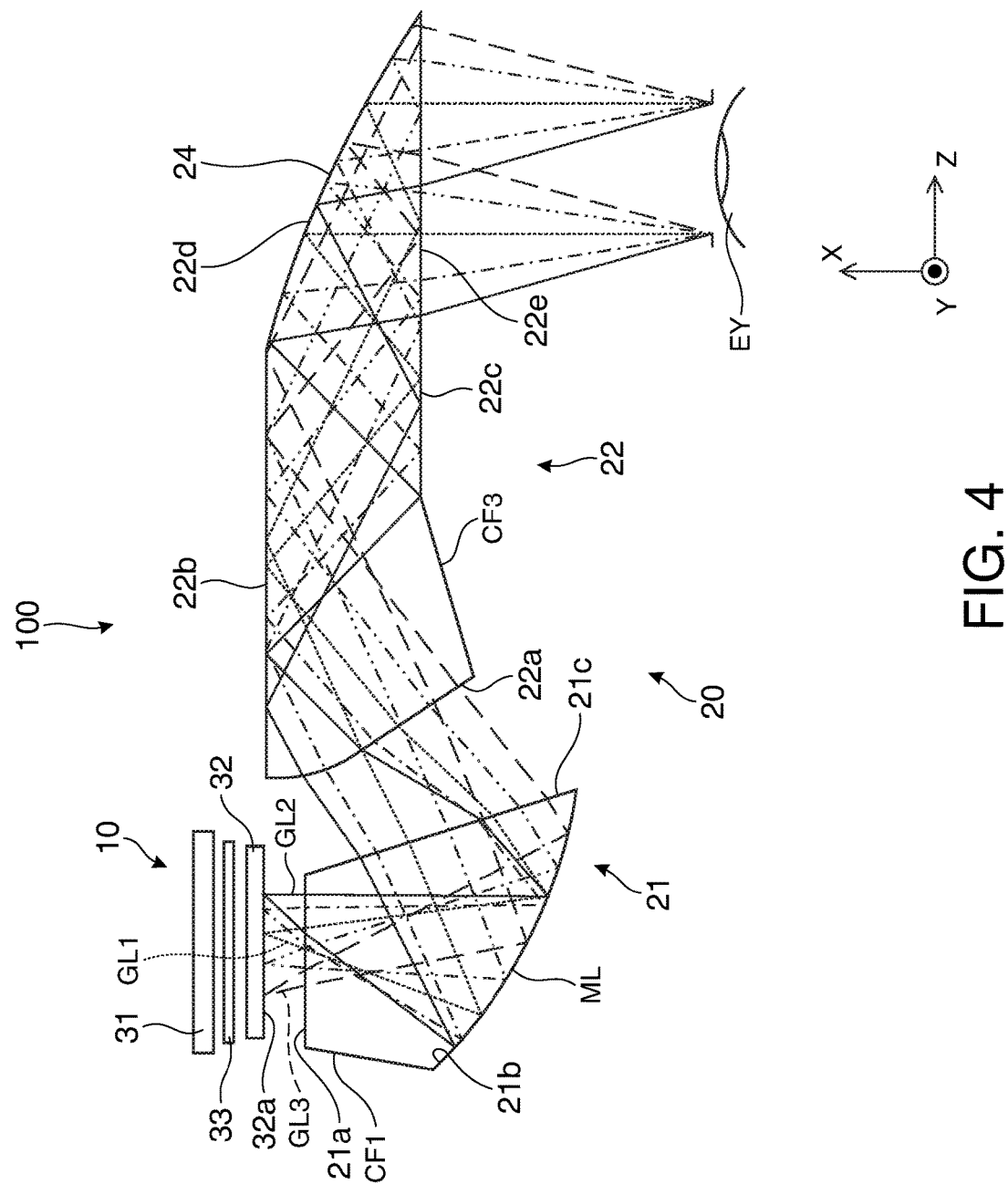
FIG. 4 is a plan view showing a virtual image display device according to a second embodiment.

As shown in FIG. 4, in this embodiment, in the optical coupling member 21 of the image relay optical system 20, the first light incident surface 21a is a convex convergent surface (specifically, a convex spherical surface or aspherical surface), the coupling member reflecting surface 21b is a concave convergent surface (specifically, a concave spherical surface or aspherical surface), and the first light emitting surface 21c is a convex convergent surface (specifically, a convex spherical surface or aspherical surface). In the light guide member 22, the second light incident surface 22a is a convex convergent surface (specifically, a convex spherical or aspherical surface). Image lights are subjected to the reflection and refraction action as appropriate by these surfaces.

In this case, the image lights GL1, GL2, and GL3 emitted from the image forming device 10 are made incident on the optical coupling member 21 from the first light incident surface 21a and totally reflected on the coupling member reflecting surface 21b to be converted into substantially parallel beams. The image lights GL1, GL2, and GL3 directly travel to the first light emitting surface 21c without returning to the first light incident surface 21a side. The image lights GL1, GL2, and GL3 are subjected to the converging action on the first light emitting surface 21c and emitted from the first light emitting surface 21c.

Subsequently, the image lights GL1, GL2, and GL3 are made incident on the second light incident surface 22a of the light guide member 22, subjected to the converging action, and totally reflected on the first and second total reflecting surfaces 22b and 22c opposed to and extending in parallel to each other in the Z direction. While being totally reflected, the image lights GL1, GL2, and GL3 are once focused from the converged state, change to the diverged state again, and travel to the light guide member reflecting surface 22d. The optical paths of the image lights GL1, GL2, and GL3 are bent by the reflection action on the light guide member reflecting surface 22d, which is a concave convergent surface (specifically, a concave spherical surface or aspherical surface). The image lights GL1, GL2, and GL3 change from the diverged state to the converted state into the parallel beams and travel to the second light emitting surface 22e.

Consequently, when the image light GL1 passes through the second light emitting surface 22e, the image light GL1 is emitted to the eye EY of the observer perpendicularly to the +Z direction from the center side of the second light emitting surface 22e, i.e., in the −X direction. The image light GL2 is emitted at an acute angle with respect to the +Z direction along the second light emitting surface 22e when the image light GL2 passes through the second light emitting surface 22e. The image light GL3 is emitted at an obtuse angle with respect to the +Z direction along the second light emitting surface 22e when the image light GL3 passes through the second light emitting surface 22e.

As explained above, in this embodiment, as in the first embodiment, a large bright virtual image with reduced aberration can be displayed by the curved surfaces of the optical coupling member 21 and the light guide member 22.

Third Embodiment

A third embodiment obtained by modifying the first embodiment is explained below with reference to FIG. 5. An image relay optical system and a virtual image display device according to this embodiment have structure same as the structure shown in FIG. 1 except the section from the optical coupling member 21 to the light guide member 22. Therefore, explanation is omitted concerning components serving as functional components of the image forming device 10 and the like. The light transmitting member is not shown in the figure.

Figure 5:
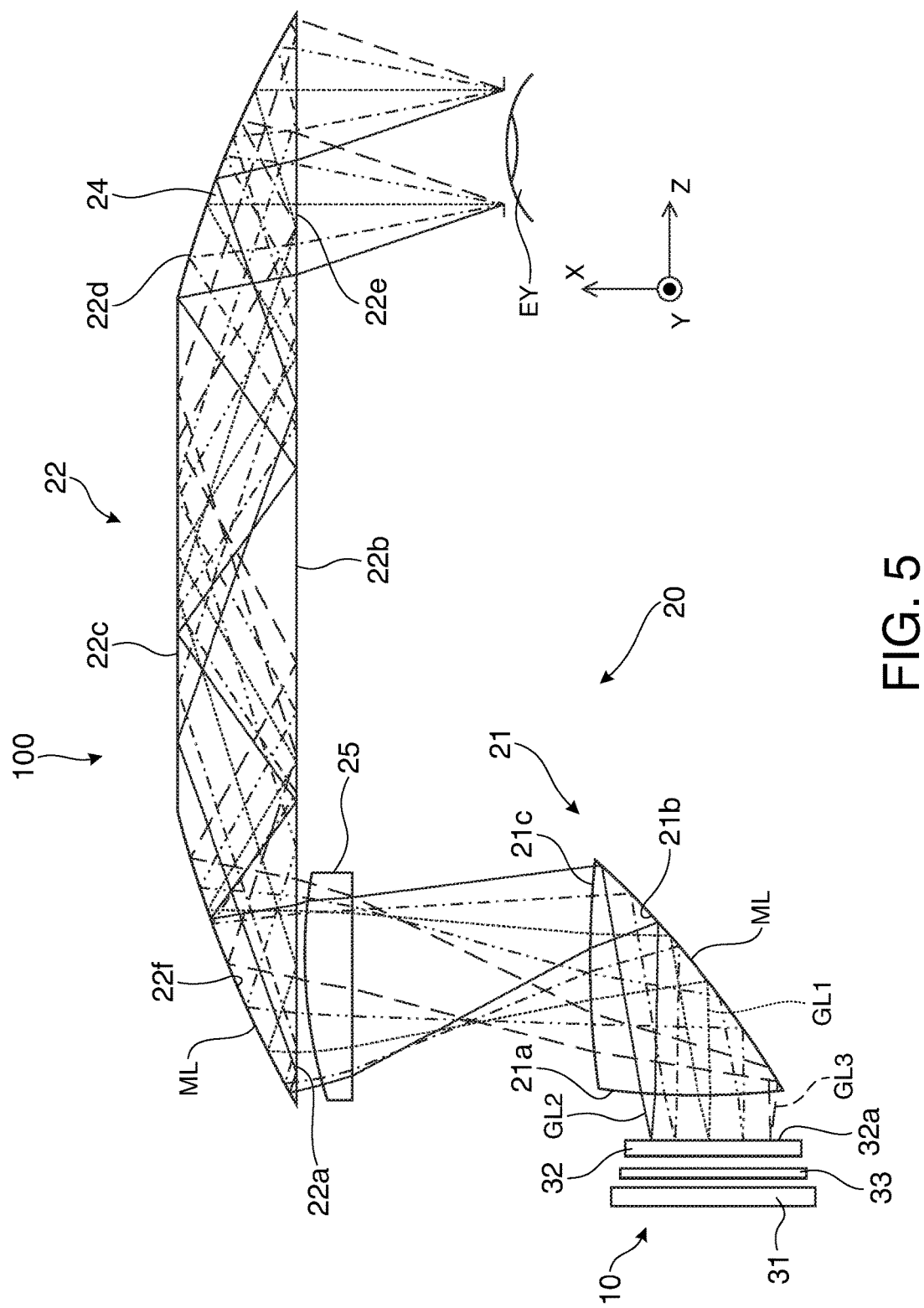
FIG. 5 is a plan view showing a virtual image display device according to a third embodiment.

As shown in FIG. 5, in this embodiment, in the optical coupling member 21 of the image relay optical system 20, the first light incident surface 21a is a convex convergent surface (specifically, a convex spherical surface or aspherical surface), the coupling member reflecting surface 21b is a concave convergent surface (specifically, a concave spherical surface or aspherical surface), and the first light emitting surface 21c is a convex convergent surface (specifically, a convex spherical surface or aspherical surface). In the light guide member 22, the second light incident surface 22a is a plane functioning as a first total reflecting surface. In other words, in the light guide member 22, the second light incident surface 22a and the first total reflecting surface 22b are formed as an integral surface continuing to the same plane. The light guide member 22 includes, as a surface opposed to the second light incident surface 22a, an opposed reflecting surface 22f between the second light incident surface 22a and the second total reflecting surface 22c. The opposed reflecting surface 22f is a concave convergent surface (specifically, a concave spherical or aspherical surface) and is a total reflecting surface that includes the reflection film ML and reflects image lights from the second light incident surface 22a to the first total reflecting surface. Further, in the image relay optical system 20, a convergent lens 25 (specifically a convex spherical or aspherical lens) is arranged between the first light emitting surface 21c of the optical coupling member 21 and the second light incident surface 22a of the light guide member 22. The image lights are subjected to the reflection and refraction action as appropriate by these surfaces and the lens.

In this case, the image lights GL1, GL2, and GL3 emitted from the image forming device 10 are made incident on the optical coupling member 21 from the first light incident surface 21a and totally reflected on the coupling member reflecting surface 21b. The image lights GL1, GL2, and GL3 travel to the first light emitting surface 21c and are emitted from the first light emitting surface 21c.

Subsequently, the image lights GL1, GL2, and GL3 are made incident on the lens 25 and subjected to the refraction action to be converted into substantially parallel beams and made incident on the light guide member 22.

Subsequently, the image lights GL1, GL2, and GL3 are made incident on the second light incident surface 22a of the light guide member 22 and returned to the second light incident surface 22a side by the reflection on the opposed reflecting surface 22f while being subjected to the converging action. When the image lights GL1, GL2, and GL3 are returned, since an angle of the image lights GL1, GL2, and GL3 with respect to the second light incident surface 22a, i.e., the first total reflecting surface 22b changes, the image lights GL1, GL2, and GL3 are totally reflected on the first total reflecting surface 22b. The image lights GL1, GL2, and GL3 are repeatedly totally reflected on the first and second total reflecting surfaces 22b and 22c opposed to and extending in parallel to each other in the Z direction. While being totally reflected, the image lights GL1, GL2, and GL3 are once focused from the converged state, change to the diverged state again, and travel to the light guide member reflecting surface 22d. The optical paths of the image lights GL1, GL2, and GL3 are bent by the reflection action on the light guide member reflecting surface 22d, which is a concave convergent surface (specifically, a concave spherical surface or aspherical surface). The image lights GL1, GL2, and GL3 change from the diverged state to the converted state into the parallel beams and travel to the second light emitting surface 22e.

Consequently, when the image light GL1 passes through the second light emitting surface 22e, the image light GL1 is emitted to the eye EY of the observer perpendicularly to the +Z direction from the center side of the second light emitting surface 22e, i.e., in the −X direction. The image light GL2 is emitted at an acute angle with respect to the +Z direction along the second light emitting surface 22e when the image light GL2 passes through the second light emitting surface 22e. The image light GL3 is emitted at an obtuse angle with respect to the +Z direction along the second light emitting surface 22e when the image light GL3 passes through the second light emitting surface 22e.

As explained above, in this embodiment, as in the first and second embodiments, a large bright virtual image with reduced aberration can be displayed by the curved surfaces of the optical coupling member 21 and the light guide member 22.

Fourth Embodiment

A fourth embodiment obtained by modifying the first embodiment is explained below with reference to FIG. 6. An image relay optical system and a virtual image display device according to this embodiment have structure same as the structure shown in FIG. 1 except the optical coupling member 21, the light guide member 22, and the like. Therefore, explanation is omitted concerning components serving as functional components of the image forming device 10 and the like. The light transmitting member is not shown in the figure.

Figure 6:
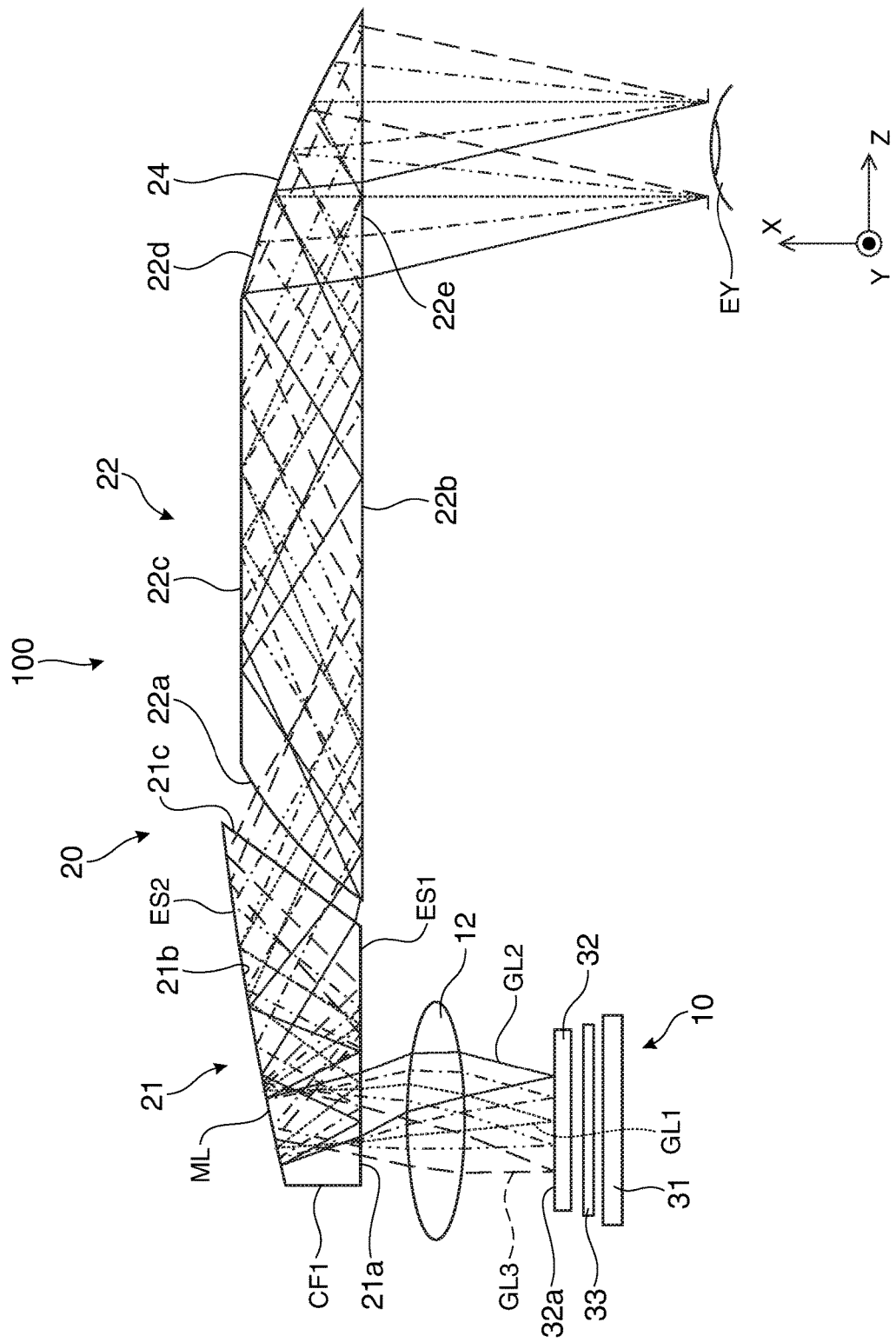
FIG. 6 is a plan view showing a virtual image display device according to a fourth embodiment.

As shown in FIG. 6, in this embodiment, in the optical coupling member 21 of the image relay optical system 20, the first light incident surface 21a is a plane functioning as a total reflecting surface, the coupling member reflecting surface 21b is a total reflection concave convergent surface (specifically, a concave spherical surface or aspherical surface), and the first light emitting surface 21c is a convex convergent surface (specifically, a convex spherical surface or aspherical surface). Specifically, in the optical coupling member 21, the first light incident surface 21a includes an extended surface ES1, which is a surface on an extended region outside a region on which image lights are made incident from the outside. The first light incident surface 21a including the extended surface ES1 functions as a total reflecting surface for the image lights as well. The coupling member reflecting surface 21b is a total reflecting surface and can reflect the image lights reflected on the extended surface ES1. In the light guide member 22, the second light incident surface 22a is a convex convergent surface (specifically, a convex spherical surface or aspherical surface). Further, in the image relay optical system 20, a convergent lens 12 (specifically a convex spherical or aspherical lens) is arranged to be opposed to the first light incident surface 21a of the optical coupling member 21 between the image forming device 10 and the optical coupling member 21. The image lights are subjected to the reflection and refraction action as appropriate by these surfaces and the lens.

In this case, the image lights GL1, GL2, and GL3 emitted from the image forming device 10 are converted into substantially parallel beams by the convergent lens 12, made incident on the optical coupling member 21 from the first light incident surface 21a, and totally reflected on the coupling member reflecting surface 21b. The image lights GL1, GL2, and GL3 travel to the first light incident surface 21a including the extended surface ES while being subjected to the converging action. When the image lights GL1, GL2, and GL3 travel to the first light incident surface 21a, since an angle of the image lights GL1, GL2, and GL3 with respect to the first light incident surface 21a changes, the image lights GL1, GL2, and GL3 are totally reflected on the first light incident surface 21a. The image lights GL1, GL2, and GL3 totally reflected on the first light incident surface 21a are totally reflected on the coupling member reflecting surface 21b again and travel to the first light emitting surface 21c while hardly losing a light amount. The image lights GL1, GL2, and GL3 are subjected to the converging action on the first light emitting surface 21c and emitted from the first light emitting surface 21c.

Subsequently, the image lights GL1, GL2, and GL3 are made incident on the second light incident surface 22a of the light guide member 22, subjected to the conversing action, and totally reflected on the first and second total reflecting surfaces 22b and 22c opposed to and extending in parallel to each other in the Z direction. While being totally reflected, the image lights GL1, GL2, and GL3 are once focused from the converged state, change to the diverged state again, and travel to the light guide member reflecting surface 22d. The optical paths of the image lights GL1, GL2, and GL3 are bent by the reflection action on the light guide member reflecting surface 22d, which is a concave convergent surface (specifically, a concave spherical surface or aspherical surface). The image lights GL1, GL2, and GL3 change from the diverged state to the converted state into the parallel beams and travel to the second light emitting surface 22e.

Consequently, when the image light GL1 passes through the second light emitting surface 22e, the image light GL1 is emitted to the eye EY of the observer perpendicularly to the +Z direction from the center side of the second light emitting surface 22e, i.e., in the −X direction. The image light GL2 is emitted at an acute angle with respect to the +Z direction along the second light emitting surface 22e when the image light GL2 passes through the second light emitting surface 22e. The image light GL3 is emitted at an obtuse angle with respect to the +Z direction along the second light emitting surface 22e when the image light GL3 passes through the second light emitting surface 22e.

Figure 7:
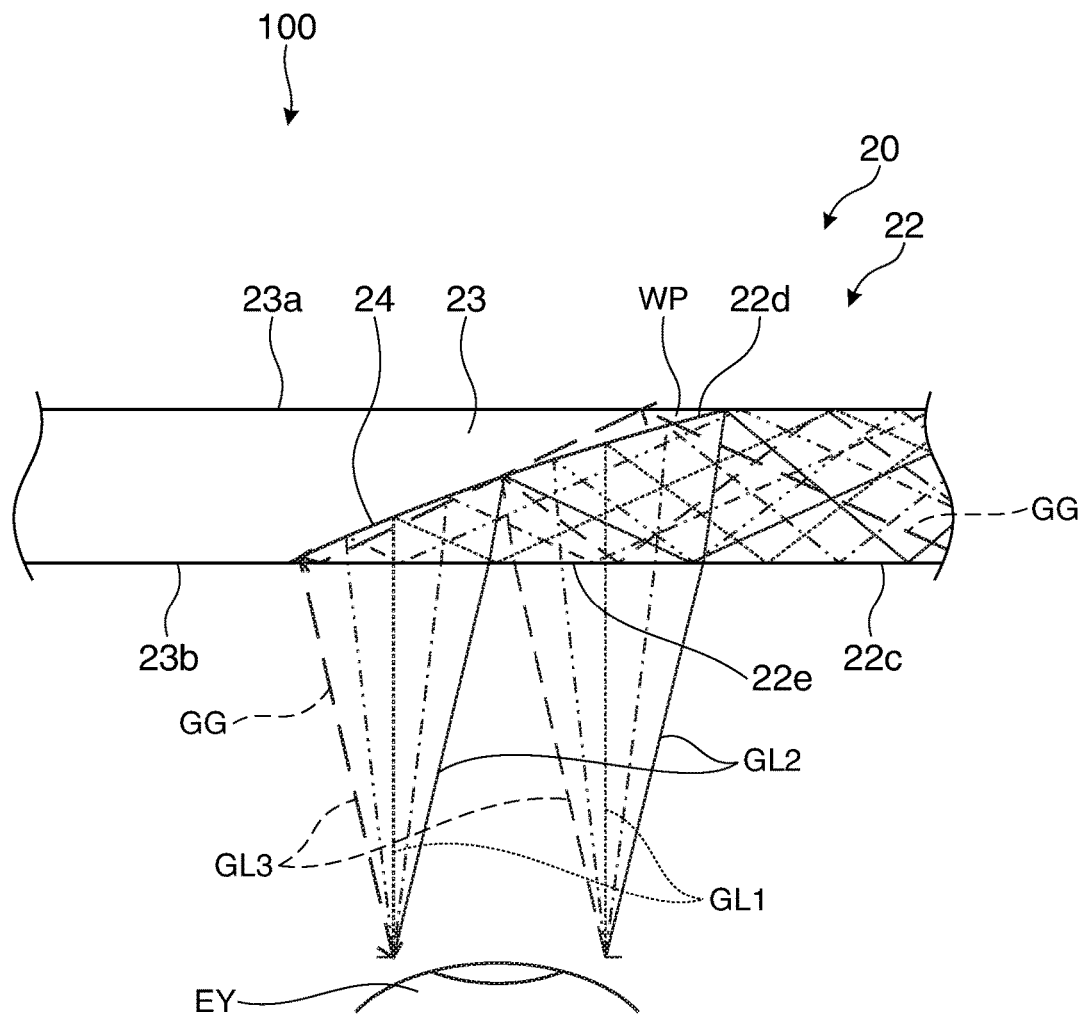
FIG. 7 is a plan view showing an image relay optical system according to a modification.

As explained above, in this embodiment, as in the first to third embodiments, a large bright virtual image with reduced aberration can be displayed by the curved surfaces of the optical coupling member 21 and the light guide member 22.
Modification Besides the embodiments explained above, for example, as shown in FIG. 7, it is possible to reduce the thickness of the light guide member 22 effectively utilizing components that follow an optical path such as image light GG. Specifically, first, the image light GG passes through the light guide member reflecting surface 22d of the light guide member 22 and are totally reflected on the first surface 23a of the light transmitting member 23. The image light GG totally reflected on the first surface 23a passes through the light guide member reflecting surface 22d again and is totally reflected on the second light emitting surface 22e present on the extension of the second total reflecting surface 22c. The image light GG totally reflected on the second light emitting surface 22e travels to the light guide member reflecting surface 22d for the third time. This time, the image light GG is reflected on the light guide member reflecting surface 22d and reaches the eye EY of the observer. It is possible to realize a reduction in thickness of the light guide member 22 by increasing efficiency of use of image lights also making use of the image light GG that follows the optical path explained above.

Others

The invention is explained according to the embodiments. However, the invention is not limited to the embodiments and can be carried out in various forms without departing from the spirit of the invention. For example, modifications explained below are also possible.

In the above explanation, the transmissive liquid crystal display device is used. However, the liquid crystal display device according to the embodiments is not limited to the transmissive liquid crystal display device. Various liquid crystal display devices can be used. For example, a configuration including a reflective liquid crystal panel is also possible. A digital micro-mirror device or the like can also be used instead of the liquid crystal display device 32. A configuration including a self-emitting device represented by an LED array or an OLED (organic EL) is also possible. Further, a configuration including a laser scanner in which a laser beam source, a polygon mirror, and other scanners are combined is also possible.

In the above explanation, the virtual image display device 100 includes the set of the image forming device 10 and the image relay optical system 20 to correspond to each of the right and left eyes. However, a configuration in which the image forming device 10 and the image relay optical system 20 are provided for one of the right and left eyes to view an image with one eye may be adopted.

In the above explanation, the see-through virtual image display device is explained. However, when it is unnecessary to cause the observer to observe an external image, it is possible to set the light reflectance of the light guide member reflecting surface 22d to about 100%.

In the above explanation, the virtual image display device 100 according to the embodiments is specifically explained assuming that the virtual image display device 100 is the head mounted display. However, the virtual image display device 100 according to the embodiments can be modified to a head-up display.

In the above explanation, on the first and second total reflecting surfaces 22b and 22c, the image lights can be totally reflected and guided by an interface with the air without applying a mirror, a half mirror, or the like to the surfaces. However, the total reflection in the invention includes reflection performed by forming a mirror coat or a half mirror film on all or a part of the first and second total reflecting surfaces 22b and 22c. For example, on condition that an incident angle of image lights satisfies a total reflection condition, a mirror coat or the like is applied to all or a part of the total reflecting surfaces 22b and 22c and substantially all the image lights are reflected. The total reflection includes the reflection in this case. If image lights having sufficient brightness are obtained, all or a part of the total reflecting surfaces 22b and 22c may be coated with a mirror slightly having transmissivity.

The entire disclosure of Japanese Patent Application No. 2011-062542, filed Mar. 22, 2011 is expressly incorporated by reference herein.

What is claimed is:

1. An image relay optical system comprising:
    an optical coupling member that is formed of a light transmissive material and on which image light is made incident; and a light guide member that is formed of a light transmissive material and guides the image light from the optical coupling member and emits the image light to an outside of the light guide member, wherein the optical coupling member includes, in order of incidence of the image light, at least (i) a first light incident surface through which the image light enters the optical coupling member, (ii) a coupling member reflecting surface, which is a single continuous reflecting surface, and (iii) a first light emitting surface, and, the optical coupling member is configured so that image light entering the first light incident surface is transmitted toward the single coupling member reflecting surface and is reflected off only the single coupling member reflecting surface, which reflects the image light toward the first light emitting surface where it is then emitted to the light guide member, the image light being reflected only internally in the optical coupling member, the first light incident surface is a convex convergent surface, the single coupling member reflecting surface is a concave convergent surface, and the first light emitting surface is a convex convergent surface, the light guide member includes at least a second light incident surface, first and second total reflecting surfaces opposed to and extending in parallel to each other, a light guide member reflecting surface, and a second light emitting surface, and the second light emitting surface is a flat surface.

2. The image relay optical system according to claim 1, wherein
the single coupling member reflecting surface is a total reflection mirror that reflects most of the image light, and
the light guide member reflecting surface is a concave convergent surface that converts the image light in the light guide member into parallel beams.

3. The image relay optical system according to claim 2, wherein
in the optical coupling member, the first light incident surface is a surface functioning as a total reflecting surface, and
in the light guide member, the second light incident surface is a convex convergent surface.

4. A virtual image display device comprising:
the image relay optical system according to claim 3; and
an image forming device that forms the image light guided by the image relay optical system.

5. The image relay optical system according to claim 2, wherein
in the light guide member, the second light incident surface is a convex convergent surface.

6. A virtual image display device comprising:
the image relay optical system according to claim 5; and
an image forming device that forms the image light guided by the image relay optical system.

7. The image relay optical system according to claim 2, wherein
in the light guide member, the second light incident surface is a surface functioning as a first total reflecting surface, the light guide member including a total reflection opposed reflecting surface that includes a concave convergent surface opposed to the second light incident surface and reflects the image light from the second light incident surface to the first total reflecting surface, and the image relay optical system includes a convergent lens arranged between the first light emitting surface of the optical coupling member and the second light incident surface of the light guide member.

8. A virtual image display device comprising:
the image relay optical system according to claim 7; and
an image forming device that forms the image light guided by the image relay optical system.

9. The image relay optical system according to claim 2, wherein
in the optical coupling member, the first light incident surface is a surface functioning as a total reflecting surface, the single coupling member reflecting surface is a total reflection concave convergent surface,
in the light guide member, the second light incident surface is a convex convergent surface, and
the image relay optical system includes a convergent lens arranged to be opposed to the first light incident surface of the optical coupling member.

10. A virtual image display device comprising:
the image relay optical system according to claim 9; and
an image forming device that forms the image light guided by the image relay optical system.

11. A virtual image display device comprising:
the image relay optical system according to claim 2; and
an image forming device that forms the image light guided by the image relay optical system.

12. The image relay optical system according to claim 1, wherein
the light guide member reflecting surface of the light guide member is a semi-transmissive mirror, and
the image relay optical system includes a light transmitting member that includes a curved surface joined to the semi-transmissive mirror and makes it possible to see an external image through the second light emitting surface and the light guide member reflecting surface.

13. A virtual image display device comprising:
the image relay optical system according to claim 12; and
an image forming device that forms the image light guided by the image relay optical system.

14. The image relay optical system according to claim 1, wherein at least one of a refractive index and dispersion of the optical coupling member is different from a refractive index and dispersion of the light guide member.

15. A virtual image display device comprising:
the image relay optical system according to claim 14; and
an image forming device that forms the image light guided by the image relay optical system.

16. A virtual image display device comprising:
the image relay optical system according to claim 1; and
an image forming device that forms the image light guided by the image relay optical system.

17. The image relay optical system according to claim 1, wherein the light guide member reflecting surface is a curved surface.

18. The image relay optical system according to claim 1, wherein the image relay optical system is configured so that image light incident on the light guide member reflecting surface has already been subjected to correction of distortion or the like further upstream in the optical path.

19. The image relay optical system according to claim 1, wherein the single coupling member reflecting surface is positioned on an opposite side of the optical coupling member from the first light incident surface.

* * * * *